United States Patent [19]

Oshima et al.

[11] Patent Number: 5,043,116

[45] Date of Patent: Aug. 27, 1991

[54] PROCESS FOR PRODUCING ONE END-SEALED CERAMIC DOUBLE WALL-STRUCTURAL TUBES

[75] Inventors: Shinji Oshima, Aichi; Hidenobu Misawa, Nagoya, both of Japan

[73] Assignee: NGK Insulators, Ltd., Aichi, Japan

[21] Appl. No.: 555,631

[22] Filed: Jul. 23, 1990

Related U.S. Application Data

[62] Division of Ser. No. 205,349, Jun. 10, 1988, Pat. No. 4,965,107.

[30] Foreign Application Priority Data

Jun. 24, 1987 [JP] Japan .................. 62-155401

[51] Int. Cl.$^5$ ........................... C04B 35/64
[52] U.S. Cl. ........................ 264/60; 264/63; 264/67; 264/317
[58] Field of Search ............. 264/60, 63, 67, 317

[56] References Cited

U.S. PATENT DOCUMENTS 4,157,194  6/1979  Takahashi .
4,817,672  4/1989  Broodman .
4,923,655  5/1990  Oshima et al. .............. 264/60

*Primary Examiner*—James Derrington
*Attorney, Agent, or Firm*—Parkhurst, Wendel & Rossi

[57] ABSTRACT

One end-closed ceramic double wall-structural tubes are disclosed, which each include inner and outer tube members, and plural supporting portions integrating the outer and inner tube members. One end of the outer tube member only is sealed. A process for producing such tubes is also disclosed, which includes the steps of extruding a green ceramic double wall-structural tube comprising inner and outer tube members, and a plurality of supporting portions integrating the outer and inner tube members; drying the green ceramic tube; grinding off the inner tube member and the supporting portions in a given depth from an end face of the dried tube, inserting a porous member made of an organic material into the ground-off portion of the tube inside the outer tube member; pouring and depositing a slurry into the tube on an axially outer side of the porous member; and drying and firing the thus one end-sealed ceramic tube. The porous member is shaped to meet an inner periphery of an end portion of the tube to be sealed, and the coefficient of thermal expansion of the slurry is the same as that of the ceramic tube during firing.

3 Claims, 3 Drawing Sheets

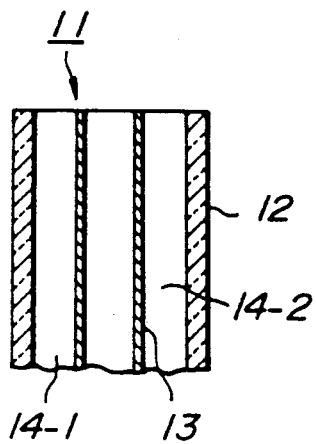
FIG._2a
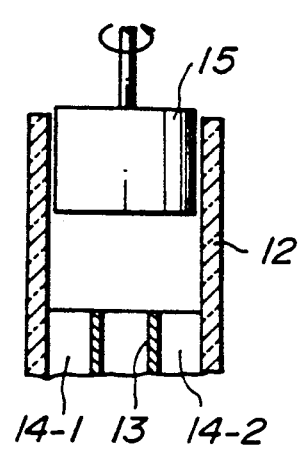
FIG._2b
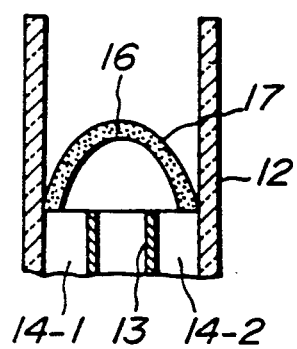
FIG._2c
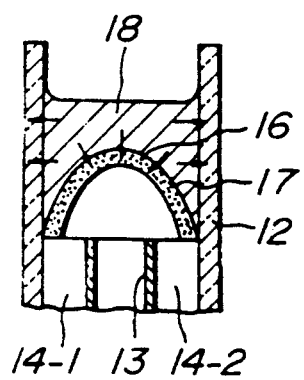
FIG._2d
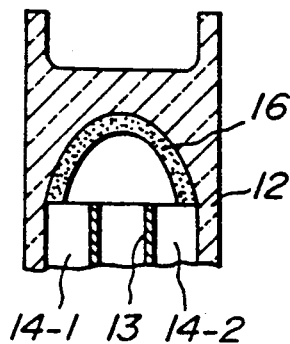
FIG._2e
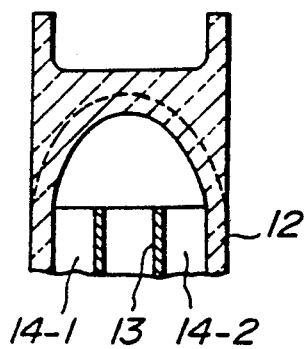
FIG._2f FIG_3
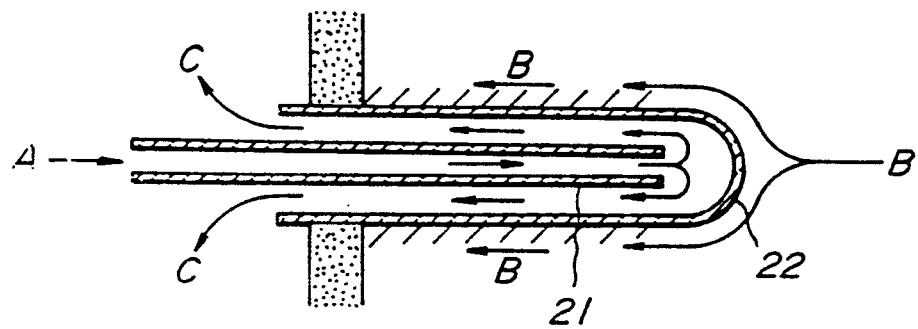

PROCESS FOR PRODUCING ONE END-SEALED CERAMIC DOUBLE WALL-STRUCTURAL TUBES

This is a Divisional Application of application Ser. No. 07/205,349 filed June 10, 1988 now U.S. Pat. No. 4,965,101.

BACKGROUND OF THE INVENTION (1) Field of the Invention

The present invention relates to one end-sealed ceramic double wall-structural tubes in which inner and outer tube members are integrally connected with each other by means of a plurality of supporting portions, and to a process for producing the same.

(2) Related Art Statement

When double wall-structural tubes in which an outer tube member and an inner tube member are integrally connected with each other through supporting portions are to be extruded, it has been impossible to obtain, by a single extrusion step, a double wall-structural tube in which an end of the tube, particularly an end of the outer tube member only is sealed.

For this reason, when an end face of an integrally extruded ceramic double wall-structural tube, particularly an end portion of its outer tube member only needs to be sealed, it is a conventional practice that a dried member having a peripheral edge of the same shape as that of an end portion of the tube to be sealed and the same composition as that of the tube is separately formed, and is fixed to the end face of the dried tube, which is fired to effect integration at the end portion of the tube.

However, the above-mentioned conventional end face-sealing process requires use of a member having the same composition as that of a double wall-structural tube and exhibiting, when dried, a given shape to seal an end of the tube. As a result, a gap is formed between the end of the tube and the sealing member in the tubular product integrated by firing. Thus, this unfavorably hinders complete integration. Consequently, ceramic double wall-structural tubes having such ends are likely to be broken, and are low in reliability.

SUMMARY OF THE INVENTION

It is an object of the present invention to solve the above-mentioned problems, and to provide one end-sealed ceramic double wall-structural tubes and production thereof, in which complete integration can be made between an end-sealing member and a wall of the tube when the tube is sealed with the sealing member to offer a highly reliable end structure of the ceramic tube.

It is another object of the present invention to provide a process for producing such ceramic double wall-structural tubes.

According to a first aspect of the present invention, there is a provision of the one end-sealed ceramic double wall-structural tubes which each comprise inner and outer tube members integrated by means of a plurality of supporting portions and which each have only one end of the outer tube member of the integral double wall-structural tube sealed.

According to a second aspect of the present invention, there is a provision of the process for producing one end-sealed ceramic double wall-structural tubes, which comprises the steps of: extruding a green double wall-structural tube having inner and outer tube members and integrated by means of a plurality of supporting portions, drying the green tube, grinding off the inner tube and a plurality of the supporting portions in a given depth measured from an end of the tube, inserting a porous member made of an organic material into the thus ground-off portion of the tube inside the outer tube member, the porous member being shaped to meet an inner shape of an end portion to be sealed, and pouring and depositing a slurry into the tube on an axially outer side of the porous member, the slurry exhibiting the same coefficient of thermal expansion as that of the tube during firing, followed by drying and firing.

In the above construction, the double wall-structural tubes are extruded such that the inner and outer tube members are connected and integrated together by means of a plurality of supporting portions, the inner tube and the supporting portions are ground off by a specified depth, and then a bottom portion of the tube is formed by inserting the porous member made of an organic material into the thus ground-off potion of the tube. Thus, the inserted organic material porous member is burnt off during the firing of the tube. Further, the inner end shape of the sealed portion can freely be selected by varying the shape of the porous member. In addition, since the slurry exhibiting the same coefficient of thermal expansion as that of the ceramic tube during firing is directly poured and deposited into the dried ceramic tube, the tissue at the joint end face becomes homogeneous. Accordingly, the same quality as that of products integrally shaped can be obtained. Moreover, the density of the deposited portion can be controlled by adjusting the slurry with an organic additive such as a binder or a dispersant. In addition, the inner and outer tube members are preferably made concentric with each other.

Besides, a material constituting the slurry is preferably the same as that of the ceramic tube, because there exists no difference in thermal expansion between them.

These and other objects, features, and advantages of the invention will be appreciated upon reading the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIGS. 1(a) and (b) are a longitudinal sectional view and an A'A cross sectional view of an embodiment of the one end-sealed ceramic double wall-structural tube according to the present invention, respectively;

FIGS. 2(a) through (f) are views showing the sequence of steps for producing a double wall-structural tube according to the present invention; and FIG. 3 is a schematic view illustrating use of a ceramic double wall-structural tube according to the present invention as a reaction tube.

DETAILED DESCRIPTION OF THE INVENTION

Figure 1A:
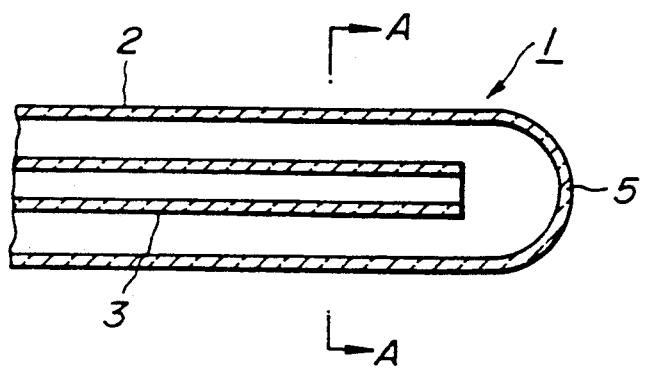
Figure 1B:
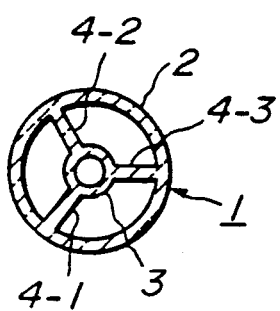

Referring to a longitudinal sectional view of an embodiment of a one end-sealed ceramic double wall-structural tube according to the present invention shown in FIG. 1(a), the double wall-structural tube 1 comprises an outer tube 2 and an inner tube 3. As is seen in an A—A line cross sectional view of FIG. 1(b), the outer tube 2 and the inner tube 3 are connected and integrated with each other by a plurality of supporting portions 4-1 through 4-3. At one tip end 5 of the double wall-structural tube 1, the outer tube 2 only is sealed in the form of a test tube, whereas a tip end of the inner tube 3 is open within the tip end 5.

FIGS. 2(a) through (f) are views showing the sequence of steps for producing a double wall-structural tube according to the second aspect of the present invention As is shown in FIG. 2(a), a double wall-structural tube 11 in a green state comprises an outer tube member 12, an inner tube member 13, and a plurality of supporting portions 14-1 and 14-2 is shaped by extrusion and dried. Next, as shown in FIG. 2(b), the inner tube 13 and the supporting portions 14-1 and 14-2 are ground off in a given depth by using a diamond grinding stone 15 having substantially the same diameter as the inner diameter of the outer tube member 12. Then, as shown in FIG. 2(c), a porous member 16 made of an organic material is inserted inside the outer tube member 12 of the dried ceramic double wall-structural tube. When the porous member 16 is inserted, it needs to be shaped such that a contact face 17 at which the porous member contacts with the slurry may conform with an inner end of a sealed portion. As the organic material porous member 16, use may be made of a water-absorbable filter paper or the like. Then, as shown in FIG. 2(d), a slurry 18 is poured inside the outer tube member 12 of the ceramic double wall-structural tube 11. This slurry exhibits the same coefficient of thermal expansion as that of the ceramic double wall-structural tube 11, or preferably is made of the same material as that of the ceramic tube 11. Water contained in the slurry is absorbed into the outer tube member 12 and the porous member 16 of the organic material to deposit the slurry. Then, as shown in FIG. 2(e), the thus obtained one end closed tube is dried, which is fired to burn off the porous member 16 of the organic material. Thereby, a one end-sealed ceramic double wall-structural tube as shown in FIG. 2(f) having a predetermined sealed shape is obtained. When in practical use, an outer end portion is removed along a broken line as shown in FIG. 2(f).

FIG. 3 shows application of a ceramic double wall-structural tube according to the present invention as a reaction tube. In FIG. 3, in order to obtain a C-liquid on reaction between an A-liquid and a B-liquid, the A-liquid is fed inside an inner tube member 21, and the B-liquid is fed outside an outer tube member 22. The outer tube member is made of a porous ceramic material. When the A-liquid flows back from the tip edge of the inner tube member 21 between the outer surface of the inner tube member 21 and the inner surface of the outer tube member 22, the A-liquid reacts with the B-liquid penetrating inside the tube through the outer tube member 22. Then, the C-liquid is taken out from an end of a space between the outer surface of the inner tube member 21 and the inner surface of the outer tube member 22.

Besides the above-mentioned application, the ceramic double wall-structural tubes according to the present invention can favorably be applied as a variety of filters, heat exchangers, concentrators, etc.

The present invention is not limited to the above-mentioned embodiments, but various modifications, variations, and changes can be made. For instance, in the above-mentioned embodiments, two or three supporting portions are provided between the inner tube member and the outer tube member. The number of the supporting portions is not limited to two or three, but any number of supporting portions may clearly be used so long as sufficient supporting strength can be obtained.

As is evident from the aforegoing detailed explanation, according to the one end-sealed ceramic double wall-structural tubes and the producing process therefor in the present invention, the double wall-structural tube comprising the outer tube member, the inner tube member and the supporting portions is extruded, the inner tube member and the supporting portions are ground off in a specific depth from an end face of the tube, a porous member of organic material is inserted inside the outer tube member, and a given slurry is poured and deposited inside the tube on the axially outer side of the porous member, followed by drying and firing. No joining trace is seen and the same quality as that of products integrally shaped can be obtained.

What is claimed is:

1. A process for producing a ceramic double-wall structural tube, comprising the steps of:
    extruding a green ceramic double-wall structural tube comprising an outer tube member, an inner tube member and a plurality of supporting portions integrating the outer and inner tube members;
    drying the green ceramic tube;
    grinding and removing the inner tube member and supporting portions to a given depth measured from a first end of the dried outer tube member;
    inserting an organic porous member into said first end of the dried outer tube member to abut against the ground supporting portions and to be spaced from an open end of said inner tube member, said organic porous member being shaped to coincide with an inner periphery of an end portion of the outer tube member to be sealed;
    pouring and depositing a slurry into said first end of the outer tube member and on an axially outer side of the organic porous member, said slurry exhibiting the same coefficient of thermal expansion as that of the ceramic double-wall structural tube during firing;
    drying said slurry to thus close said first end of the outer tube member; and
    firing the ceramic double-wall structural tube.

2. The process of claim 1, wherein said slurry comprises the same material as that of said ceramic double-wall structural tube.

3. The process of claim 1, wherein said inner tube member is arranged concentrically within said outer tube member.

* * * * *